US012330923B2

(12) United States Patent
Lippmann et al.

(10) Patent No.: US 12,330,923 B2
(45) Date of Patent: Jun. 17, 2025

(54) MODULAR PULLEY BLOCK

(71) Applicant: Fluoron Inc., Elkton, MD (US)

(72) Inventors: Matthew Lippmann, Oak Park, IL (US); David O'Neill, Vashon, WA (US)

(73) Assignee: Spectrum Lab Holdings, LLC, Elkton, MD (US)

( * ) Notice: Subject to any disclaimer, the term of this patent is extended or adjusted under 35 U.S.C. 154(b) by 72 days.

(21) Appl. No.: 18/203,423

(22) Filed: May 30, 2023

(65) Prior Publication Data

US 2024/0400355 A1 Dec. 5, 2024

(51) Int. Cl.
*B66D 3/04* (2006.01)

(52) U.S. Cl.
CPC .......................................... *B66D 3/04* (2013.01)

(58) Field of Classification Search
CPC .......... B66D 3/04; B66D 3/043; B66D 3/046; B66D 3/06; B66D 3/08; B66D 3/10
See application file for complete search history.

(56) References Cited

U.S. PATENT DOCUMENTS 973,177 A * 10/1910 McCready ............... B66D 3/04 254/409
1,671,435 A * 5/1928 McKissick ............. B66D 3/046 254/402
2,291,894 A 7/1940 Gwinn, Jr.
2,633,329 A 2/1950 Le Bus
2,667,331 A 7/1951 Robins et al.
3,199,841 A * 8/1965 McKean ................ B66D 3/046 254/405
3,337,188 A * 8/1967 Manson ................... B66D 3/04 254/412
3,489,470 A 1/1970 Lunde et al.
3,899,158 A 8/1975 Johnson
5,154,401 A * 10/1992 Schramm ................ B66D 3/06 254/416
5,538,224 A 7/1996 Powell et al.
6,974,125 B2 12/2005 Renton
7,000,905 B1 2/2006 Lutter et al.
(Continued)

FOREIGN PATENT DOCUMENTS

DE 102019219001 A1 6/2021
GB 190913244 A * 11/1909
GB 2190436 A * 11/1987 ............... B66D 3/04

*Primary Examiner* — Anna M Momper
*Assistant Examiner* — Nathaniel L Adams
(74) *Attorney, Agent, or Firm* — Invention To Patent Services; Alex Hobson

(57) ABSTRACT

A modular block has lad wye plates configured on opposing sides of the block that carry the load from an axle fastener to load fasteners coupled to the eye. This configuration of the load wye plates enables the other components, including contact surface components such as the sheave, sheave wheel, side plates and bushings to be made of lower weight materials, such as polymers thereby increase the load to weight ratio of the modular block. Ultrahigh molecular weight polyethylene (UHMWPE) is a preferred material for the contact components and high load capacities are realized with these polymeric components used in conjunction with the load wye plates. Also, the use of non-sparking polymeric or composite materials is required in some applications to prevent fire or combustion.

22 Claims, 11 Drawing Sheets

(56) References Cited

U.S. PATENT DOCUMENTS

| | | | | |
|---|---|---|---|---|
| 7,347,411 | B1 * | 3/2008 | Teel | B66D 3/046 254/405 |
| 11,279,601 | B2 | 3/2022 | Kaybidge | |
| 2008/0067482 | A1 | 3/2008 | Carlson et al. | |
| 2010/0317474 | A1 | 12/2010 | Fogg et al. | |
| 2014/0131157 | A1 * | 5/2014 | Chih | F16D 41/12 192/44 |
| 2015/0314998 | A1 | 11/2015 | Ishikawa et al. | |

* cited by examiner

MODULAR PULLEY BLOCK

BACKGROUND OF THE INVENTION

Field of the Invention

The invention relates to a pulley block that is modular having a load plate that enables interchanging of the side plates, bushings and wheels without changing the load carrying capacity, which enables spark prevention and the use of corrosion resistant materials for the side plates and other components that may otherwise require metal parts.

Background

Pulley blocks are used in various industrial applications such as marine rigging, construction equipment, and logging to give direction to the rope while loaded and increase the line pull or lifting capacity of a hoist or winch. Pulley blocks are routinely used for lifting or moving heavy objects. The blocks have a sheave with a cable guide for retaining the cable as it spin around the sheave. In some applications it is important to prevent sparking due to a metallic cable moving through a block and sparking due to contact with metallic parts of the block. In these situations, the contact parts may be made of a non-sparking material such as a polymer, or composites, such as carbon fiber.

In some situations, synthetic or polymeric cables are used and the contacts within the block can be rough due to corrosion and this can produce wear on the synthetic cables. Metallic components can rust and corrode in the elements producing rough surfaces that are not well suited for synthetic cable use.

SUMMARY OF THE INVENTION

The invention is directed to a modular block that may be used as a pulley block, pulley sheave, cable block, cable sheave, or variations thereof. For the purposes of this description, these terms may be used interchangeably to describe a structure in which a wheel is mounted wherein a cable or cable-like member (such as but not limited to a cable, rope, string, cord, etc.) is configured to translate along the wheel. The modular block has load wye plates on opposing sides of the block that carry the load from the load fasteners, coupled to a split load block, to the axle fastener, extending through the sheave wheel and wheel aperture of the sheave. This load transfer arrangement enables other components of the block to be made of lower weight non-metallic materials, such as polymers or carbon fiber composites. In addition, this load transfer arrangement with the load wye plates enables contact components, components that may contact the cable to be non-metallic or non-sparking, such as polymers or carbon fiber composites. The use of non-metallic components may significantly reduce the weight of the block making it easier to manipulate and transport. Also, the modular block is modular, allowing for components to be interchanged for a given application, wherein the material types of the components may be changed, or the size or geometry of the components may be changed.

An exemplary modular block has a pair of load fasteners that retain an eye having a mount aperture for securing the modular block to a support. The eye may be a fixed eye or may be configured to swivel, thereby allowing the modular block to swivel with respect to a support it is affixed to. A fixed eye may be attached to a load block and the load fasteners may extend through apertures in the load block to secure the fixed eye to the modular block. A swivel eye may be preferred in many applications as it may aid in reducing wear on the sheave due to the cable being pulled at an offset angle. A swivel eye will enable the modular block and sheave to swivel into alignment with the cable extending around the sheave. In the case of a swivel eye, a pair of load fasteners extend through a pair of split load blocks that extend around a retainer shank of the swivel eye to enable the swivel eye to rotate. A base flange of the swivel eye secures the swivel eye between the split load blocks.

An eye, fixed eye or swivel eye, may be made be made of a material or coated with a material to prevent corrosion and/or sparking from contact with the cable. The eye is a load carrying member and therefore may preferably be made of metal, such as steel or tempered steel for strength, for example. The eye may have corrosive resistant coating and/or a spark resistant coating which may include a paint, polymer or anodized coating which may be a different metal than the metal the eye is made of.

The load fasteners extend through load wye plates configured on either side of the modular block. The load wye plates extend from the load fastener apertures to the rotational axis of the sheave and have an axle fastener aperture. The load on the modular block is therefore carried by the axle fastener extending through the sheave wheel aperture and through the axle fastener apertures in the load wye plates, by the load wye plates, and then by the load fasteners extending through the load fastener apertures in the load wye plate, and finally by the eye or swivel eye. The load wye plates each have three apertures for supporting fasteners that carry the load. This configuration enables the other components of the modular block to have lower weight carrying capacity and therefore can be made of non-metallic parts, such as polymers. For example, the side plates, as well as the sheave or sheave wheel may be made of polymeric or composite materials that prevent sparking when a metallic cable is used. The primary contact surface with the cable are the side plates and the sheave. The base flange of the eye may also be a contact surface for the cable and therefore may be made of a non-sparking material or coated with a non-sparking material, such as a polymeric material.

The configuration of the fasteners through the load wye plates and the load wye plates carrying the load enables the other components of the modular block to be interchanged as required for the application. The size or geometry of the other components may be quickly interchanged as requirements for the modular block change. Also, as described herein, lower weight components may be used and the load to weight ratio greatly increased for the modular block. In addition, the contact surfaces of the block, such as the side plates and the sheave may be changed out more regularly due to wear from contact with the cable.

The side plates may be very thin as they carry no load from the cable and therefore may be no more than about 8 mm, no more than about 5 mm, no more than about 4 mm, no more than about 2 mm and any range between and including the thickness values provided. A thin side plate reduces the mass of the block.

The load wye plate has load extension arms that extend from the wheel portion at an offset angle. The angle may be within a certain range to enable high load carrying capacity at a reduced weight of the load wye plate. A very large offset angle, such as more than 90 degrees may put more bending force on the extension arms at the connection with the wheel portion which may lead to failure at very high loads. The angle must be large enough to position the load fastener apertures to fit through the split load block. Therefore, an offset angle of about 25 degrees or more, about 30 degrees or more, about 45 degrees or less, about 60 degrees or less, about 75 degrees or less, and less than 90 may be effective offset angles. An offset angle in the range from about 25 degrees to about 50 degrees may be preferred for weight and load carrying capacity considerations.

An exemplary modular block may be sized for a given application and may have a sheave with a diameter of about 10 cm or more, about 15 cm or more, about 20 cm or more, about 25 cm or more, about 40 cm or more, and any range between and including the diameters provided.

A modular block may be required to carry a high load induce by the tension on the cable extending around the sheave, such as about 1,814 kb (4,000 lb) or more, about 2,721 kg (6,000 lbs) or more, about 4,536 kg (10,000 lbs) or more, about 7,257 kg (16,000 lbs) or more about 9,072 (20,000 lbs) or more and any range between and including the loads values provided. A block may be tested by the application of a load, wherein the block cannot deform under a load or break or otherwise fail under a load, such as described in ASTM-E4.

A polymer, as used herein, may be a thermoplastic polymer, such as polyethylene, or a thermoset polymer that is cross-linked. A polymer may be an ultrahigh molecular weight polymer having a molecular mass of about 3.5 million atomic mass units (amu) or more, about 5.0 million amu or more about 7.0 million amu or more and any range between and including the values provided. An exemplary polymer for use as the side plate or sheave may be an ultrahigh molecular weight polyethylene UHMWPE that has a molecular weight of about 1 million g/mole or more, about 2 million g/mole or more, about 3 million g/mole or more and any range between and including the values provided.

Non-metallic, as used herein, is a material that is made of materials such as polymer or plastic that does not include a metal. As described herein, components of the modular block may be made of non-metallic materials to prevent sparking with contact with the cable which may be metal. A component of the modular pulley block may consist of, or consist essentially of non-metallic material, wherein no more than 5% of the weight is metallic. A component consisting of non-metallic material has no metallic material.

A modular pulley block is referred to as a modular block or simply a block herein.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
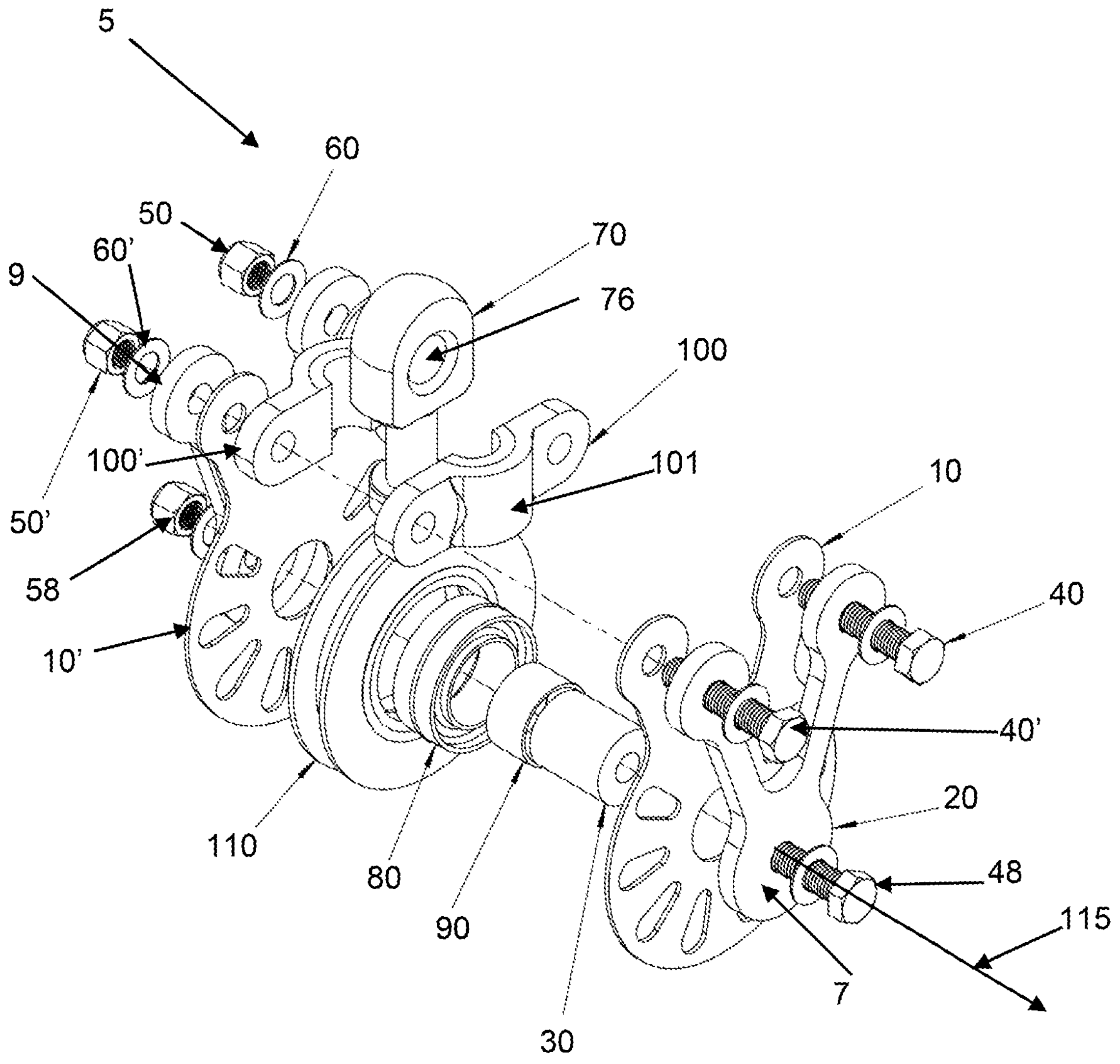
FIG. 1 shows an exploded perspective view of an exemplary modular block.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a block 5, an exemplary modular pulley block, has two side plates 10, 10' configured on opposite sides of a sheave 110. Load wye plates 20, 20', which are the load carrying members for the block, are configured adjacent to each of the side plates. Two split load blocks 100 are configured between the side plates, and an eye 70, a swivel eye as shown, is configured between the split load blocks 100, 100', a type of load block 101; which may be a one-piece unit as described herein. The swivel has a mount aperture 78 for attachment of the block 5 to a support structure. The load wye plates 20, 20', side plates 10, 10', and split load blocks 100, 100' are held together with load fasteners 40, 40' which are shown as threaded bolts in FIG. 1. The load fasteners are received and retained by fastener retainers 50, 50', which are shown as threaded nuts in FIG. 1. The axle fastener 48 is received and retained by axle retainer 58, which is shown as a threaded nut in FIG. 1. Washers 60,60' are configured between the fastener retainers 50, 50', respectively, and the load wye plates 20', as well as between the load fasteners 40, 40' and the other of the load wye plates 20. The load fasteners extend through the load wye plates to transfer load from the axle fastener 48 through load wye plates to swivel eye 70. The axle fastener 48 extends through the load wye plates, through the bushing 90, the sheave spacer 30, and the sheave wheel 80. The three fasteners or bolts extending through the load wye plate are in shear and can carry a very large load. The load wye plates are robust metal or other effectively strong material to carry the load from the swivel eye to the axle fastener 48. This enables the side plates 10, 10' to be made of a wider range of materials, as they carry no load. Therefore, plastic side plates can be used, especially when spark arresting is desired.

A sheave wheel 80 is configured within the sheave 110 and a bushing 90 is configured within the sheave wheel 80 to enable rotation of the sheave wheel and the sheave 110. A sheave spacer 30 is configured within the bushing 90 whereby the sheave 110, sheave wheel 80, bushing 90, and sheave spacer 30 are concentric. The sheave 110 has a rotational axis 115 about which the sheave rotates and along with the axle fastener 48 extends from a first side 7 to a second side 9 of the modular block 5.

Figure 3:
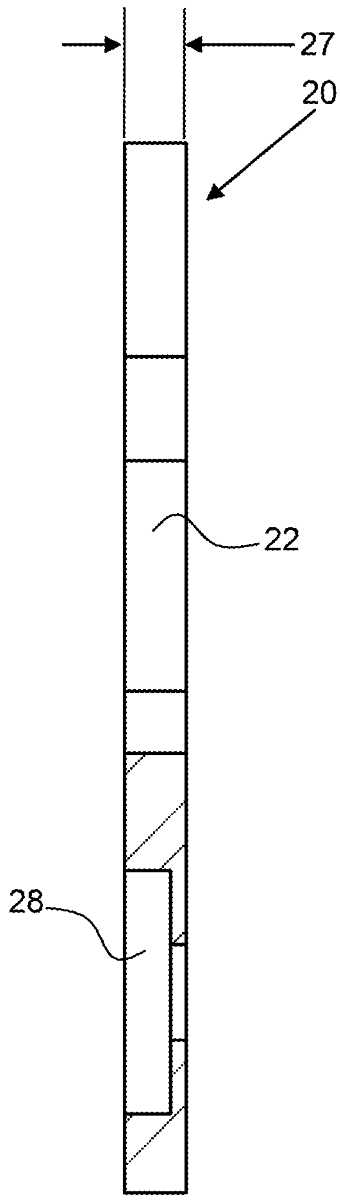
FIG. 3 shows a side view of the load wye plate shown in FIG. 2.
Figure 2:
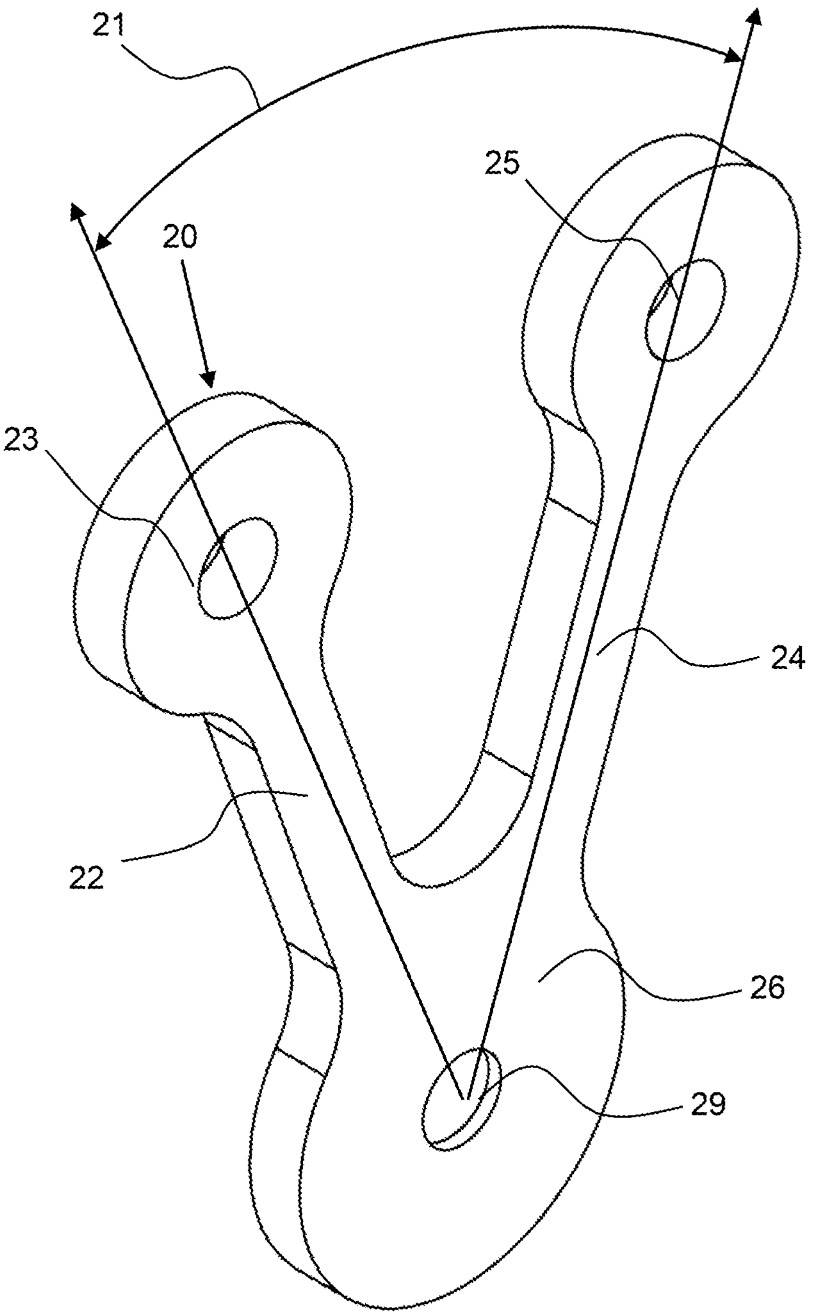
FIG. 2 shows a perspective view of a load wye plate having a wheel portion with an axle fastener aperture and a pair of load extension arms that extend from the wheel portion at an offset angle and each having a load fastener aperture for receiving a load fastener therethrough.

As shown in FIGS. 2 and 3, a load wye plate 20 has a wheel portion 26 through which an axle fastener aperture 29 is configured. A bushing recess 28 is configured partially through the wheel portion 26 whereby the bushing recess 28 is concentric with the axle fastener aperture 29. The bushing recess 28 has a diameter that is greater than sheave spacer shown in FIG. 1. The sheave spacer (not shown in FIG. 2 or 3) of the block may be partially configured within the bushing recess 28 of the load wye plate 20. An axle fastener (not shown in FIG. 2 or 3) of the block may be configured through the axle fastener aperture 29 of the load wye plate 20.

Two load extension arms 22, 24 extend from the wheel portion 26 at an offset angle 21 to each other. A load fastener aperture 23, 25 is configured at the end of each load extension arm 22, 24. A load fastener (not shown in FIG. 2 or 3) may be configured through each load fastener aperture 23, 25 to assemble the block. The load wye plate 20 has a thickness 27, which may be a uniform thickness along each of the load extension arms 22, 24 as well the wheel portion 26, as shown. As described herein, the thickness 27 of the load wye plate may be substantial and effectively thick to enable load carrying from the axle fastener, to the load fasteners, which carry the load from the swivel eye. The thickness 27 of the load wye plates 20, 20' maybe much greater than the thickness 17 of the side plates shown in FIG. 4, such as about twice as thick or more, about three times as thick or more, about five times as thick or more, about ten times as thick or more and any range between and including the values provided.

Figure 4:
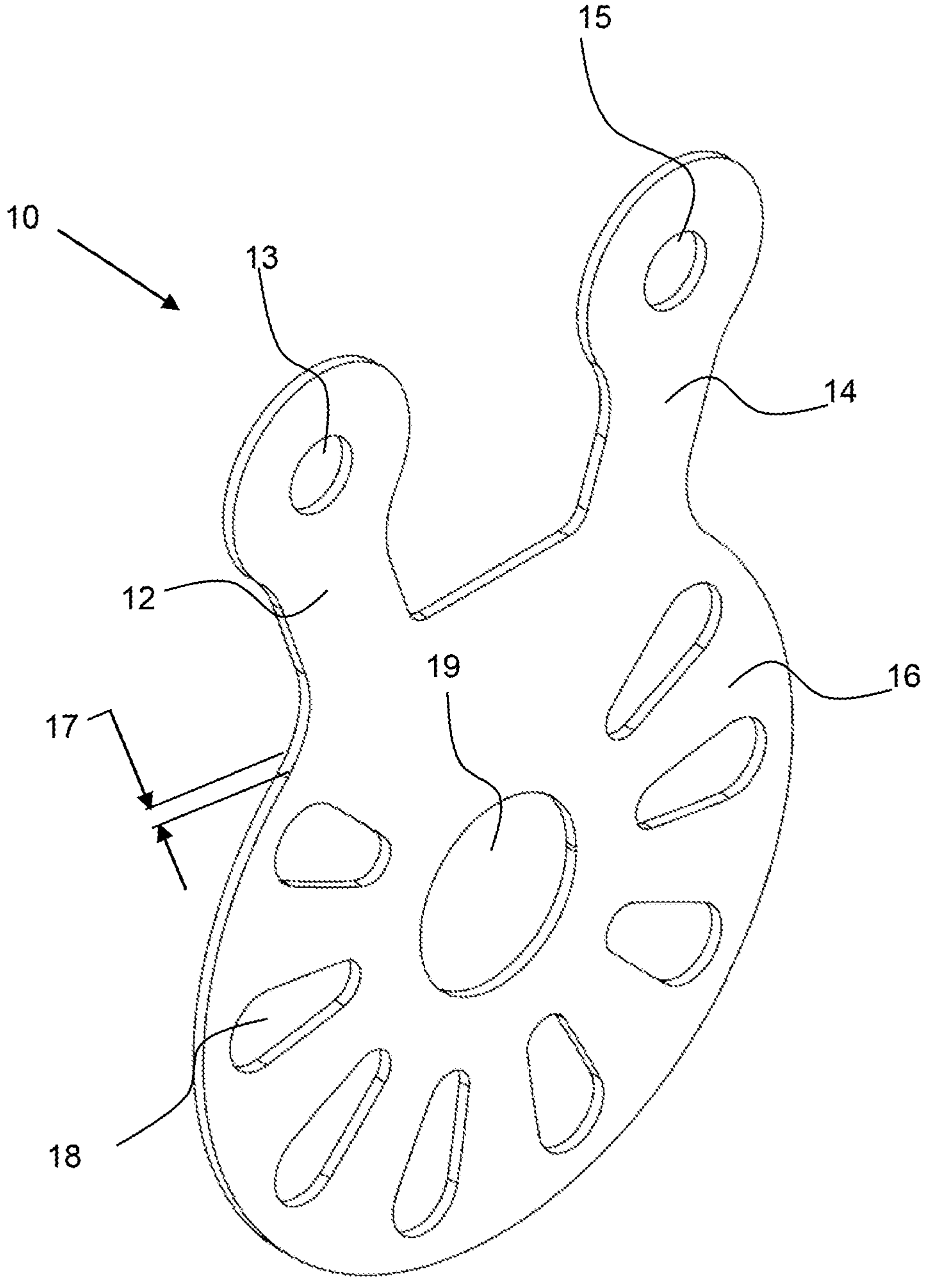
FIG. 4 shows a perspective view of a side plate having a wheel portion with an axle fastener aperture and a pair of retainer extension arms that extend from the wheel portion at an offset angle and each having a load fastener aperture for receiving a load fastener therethrough.

As shown in FIG. 4, a side plate 10 has a spacer aperture 19 through which the spacer (not shown in FIG. 4) may extend through. The spacer aperture 19 is configured through a wheel portion 16 of the side plate 10. Cooling apertures 18 are also configured through the wheel portion 16. The cooling apertures also reduce the weight of the side plate 10. The cooling apertures 18 may serve to cool the block when the block heats up due to rotation of the sheave under a load. The cooling apertures 18 may also serve to reduce the overall weight of the block. Two retainer extension arms 12, 14 extend from the wheel portion 16. Load fastener apertures 13, 15 are configured at the end of each extension arm 12, 14, respectively. A load fastener (not shown in FIG. 4) may be configured through each load fastener aperture 13, 15 and prevent the side plate from rotating, or affix the side plate in position. The side plate 10 has a thickness 17 that may be very thin, as described herein, as the side plate is not designed to carry any load. Also, the side plates may be made of plastic or other non-sparking, or non-metallic material.

Figure 5:
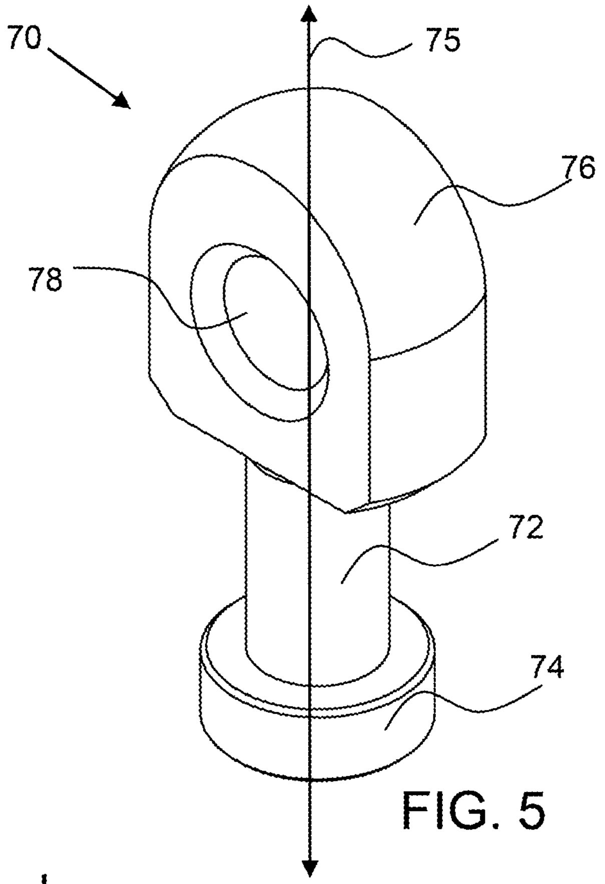
FIG. 5 shows a perspective view a swivel eye having a mount portion with a mount aperture for securing the modular block to a support, a retainer shank extending down from the mount portion and a base flange for retaining the split load blocks therearound.
Figure 6:
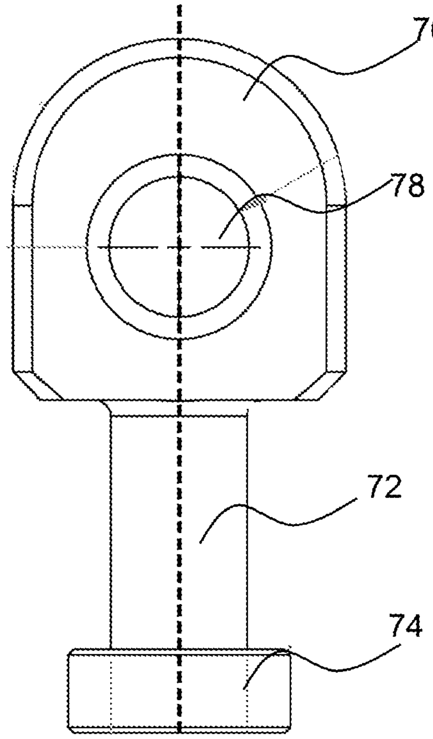
FIG. 6 shows a front view of the swivel eye shown in FIG. 5.
Figure 7:
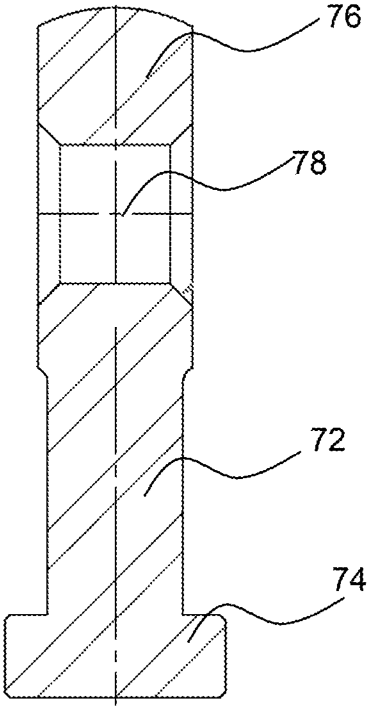
FIG. 7 shows a side cross-section view of the swivel eye shown in FIG. 5.

As shown in FIGS. 5 to 7, a swivel eye 70 has a mount portion 76, such as a mount aperture 78 as shown, and a base flange 74 connected by a retainer shank 72. The retainer shank 72 and base flange 74 are shown as concentric cylinders or rods, wherein the retainer shank 72 is circular in outer surface cross section to enable the swivel eye to rotate within the split load blocks. The base flange 74 extends radially outward from the swivel eye axis 75 more than the retainer shank 72. The enlarged base flange 74 retains the swivel eye between the split load blocks. A mount aperture 78 is configured through the mount portion 76. The swivel eye 70 may be used to mount the block to a structure (not shown in FIGS. 5-7) by configuring a portion of the structure, or a fastener coupled to a structure, through the mount aperture 78 of the swivel eye 70. The mount portion is pulled when the sheave is put under load by a cable extending around the sheave. This load is transferred to the split load blocks and to the load fasteners. The load wye plate carries the load between the load fasteners and the axle fastener.

Figure 8:
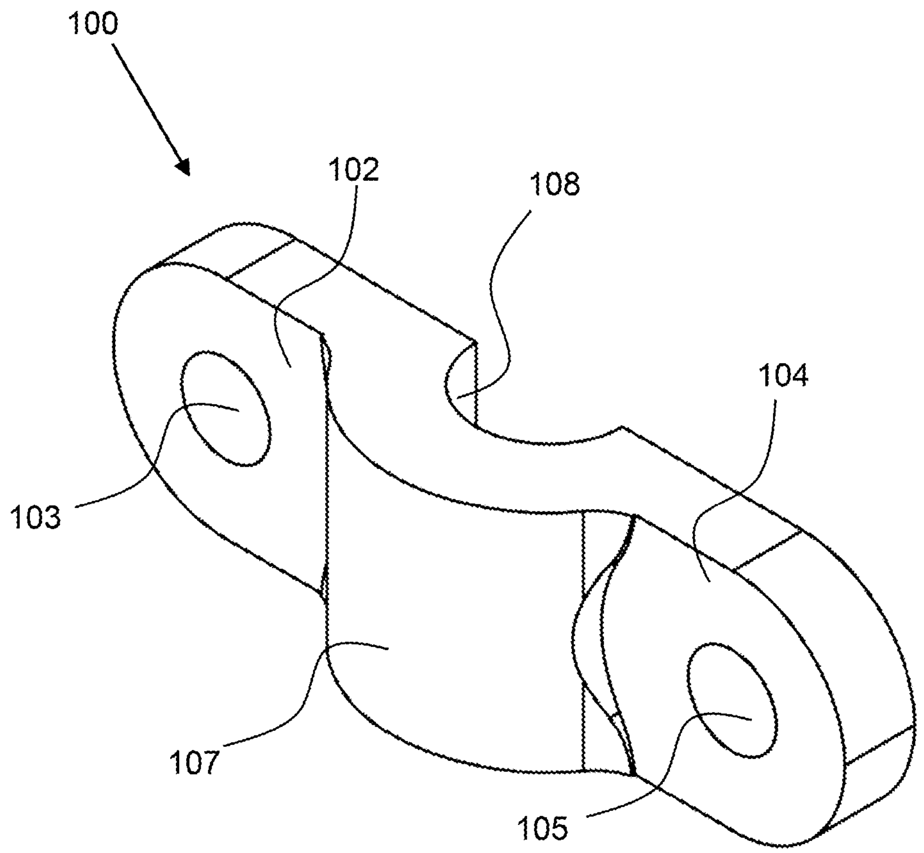
FIG. 8 shows a perspective view of a split load block having two load flanges each with a load flange aperture for receiving a load fastener therethrough.
Figure 9:
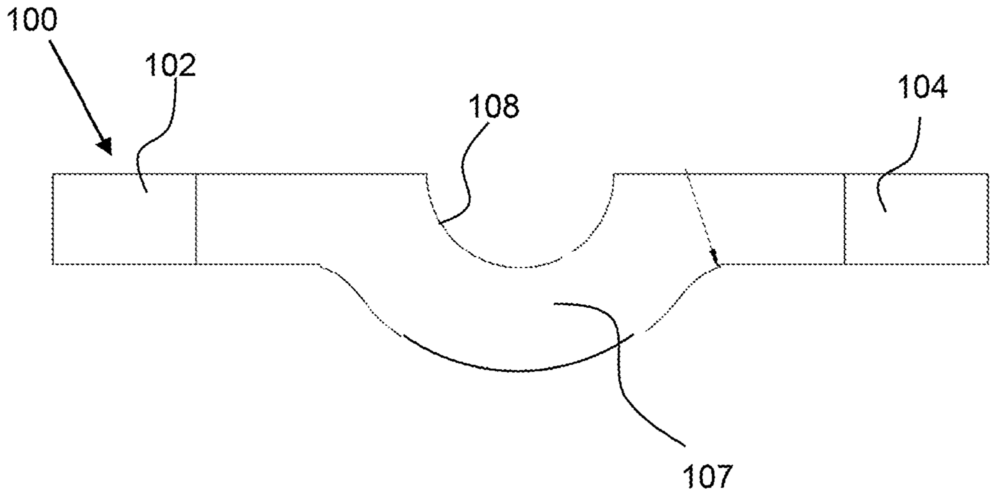
FIG. 9 shows a top view of the split load block shown in FIG. 8.

As shown in FIGS. 8 and 9, a split load block 100 has a swivel eye receiver 107 and two load flanges 102, 104. Load flange apertures 103, 105 are configured through each load flange 102, 104, respectively. Load fasteners (not shown in FIG. 8 or 9) may be configured through each load flange aperture 103, 105. Two split load blocks 100 may be configured adjacent to one another wherein the retainer shank of the swivel eye (not shown in FIG. 8 or 9) may be configured between the swivel eye receivers 107 of the two split load blocks 100, thereby retaining the swivel eye between the two split load blocks 100. The interior surface 108 of the swivel eye receiver 107, may extend along a radius of curvature to enable the retainer shank of the swivel eye 70 to freely rotate between the swivel eye receivers.

Figure 11:
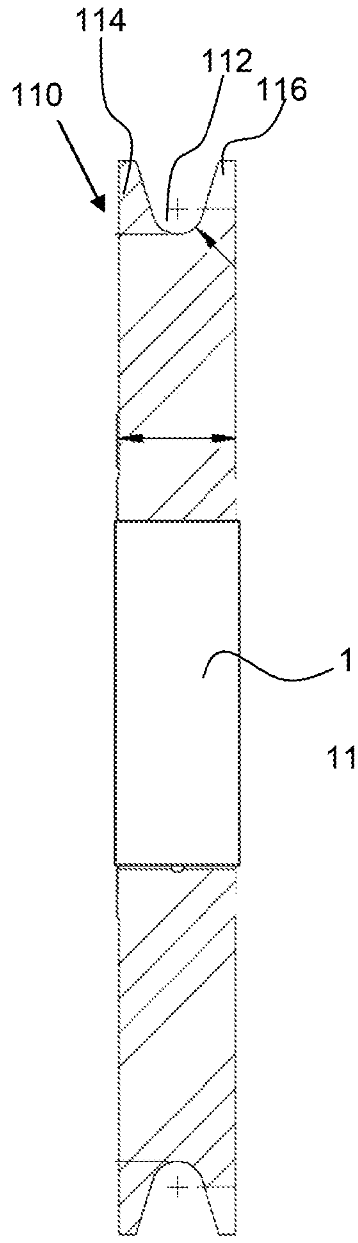
FIG. 11 shows a side cross-section view of the sheave shown in FIG. 10.
Figure 10:
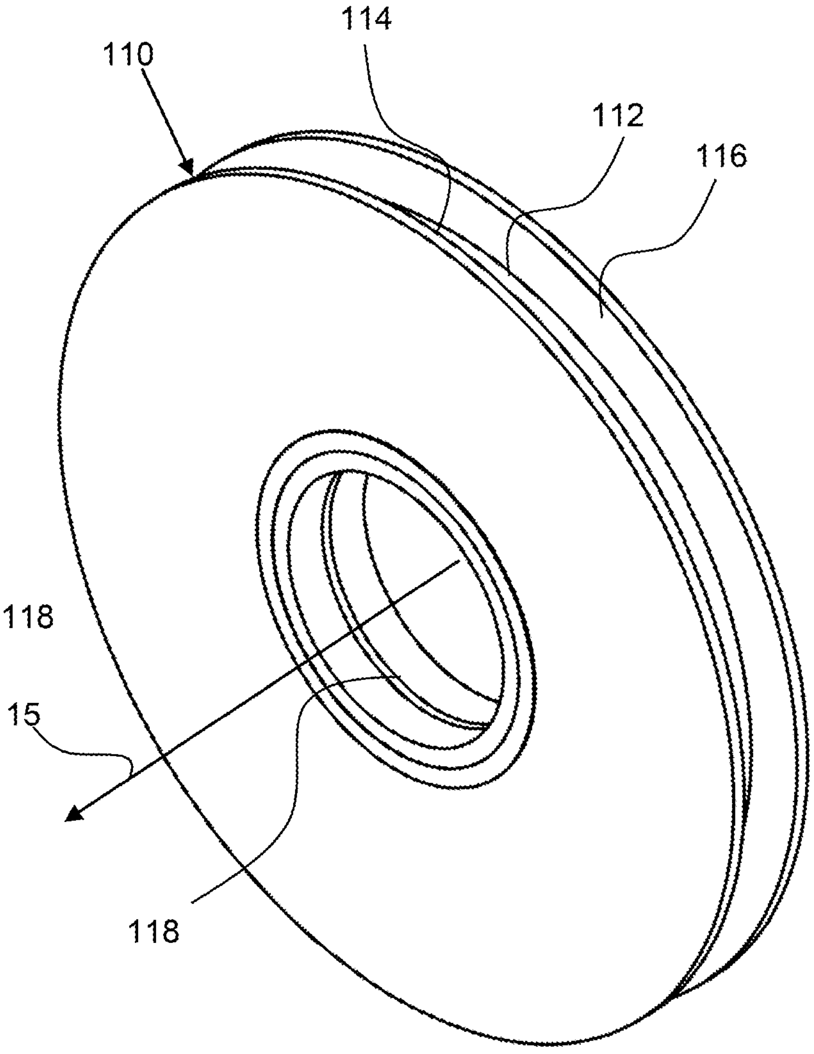
FIG. 10 shows a perspective view of a sheave with a cable guide configured around the sheave and a wheel aperture configured through the sheave.
Figure 12:
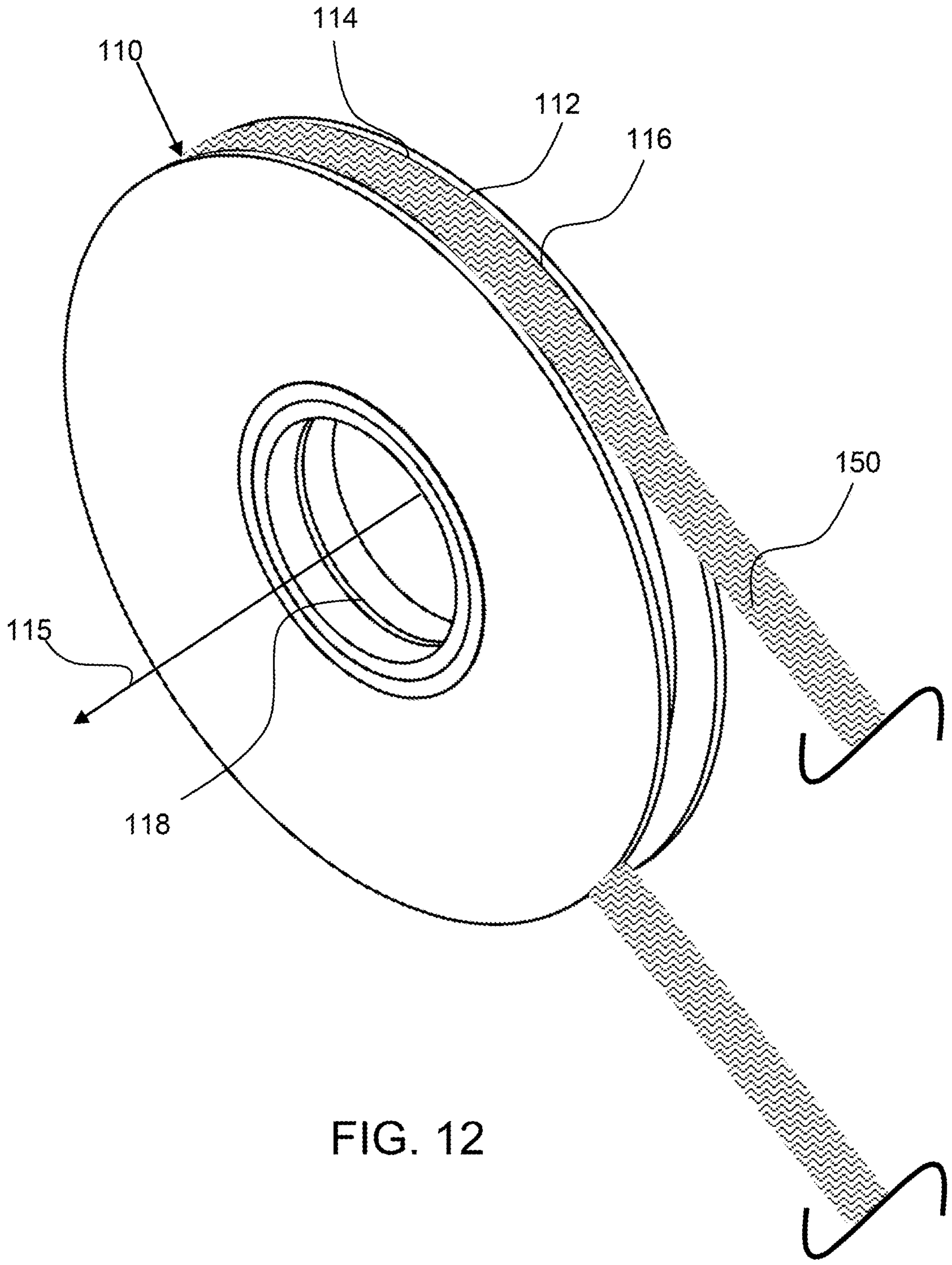
FIG. 12 shows a perspective view of a sheave with a cable extending around the cable guide.

As shown in FIGS. 10, 11 and 12, a sheave 110 has a cable guide 112 configured around the outer perimeter of the sheave 110. Two guide walls 114, 116 extend from the sides of the cable guide 112, creating a guide well in which a cable (not shown in FIG. 10 or 11) may be configured. The cable may be configured between the two guide walls 114, 116 and thereby be configured in the guide well of the cable guide 112. The cable guide 112 may then guide the cable as the cable translates is moved around the sheave 110 and rotates the sheave. The sheave 110 has a wheel aperture 118 through which the sheave wheel of the block (not shown in FIG. 10 or 11) may be configured. FIG. 12 shows a perspective view of a sheave 110 with a cable 150 extending around the cable guide. As described herein, the cable may be a metal cable or in some cases may be a high strength polymeric or non-metallic cable.

Figure 13:
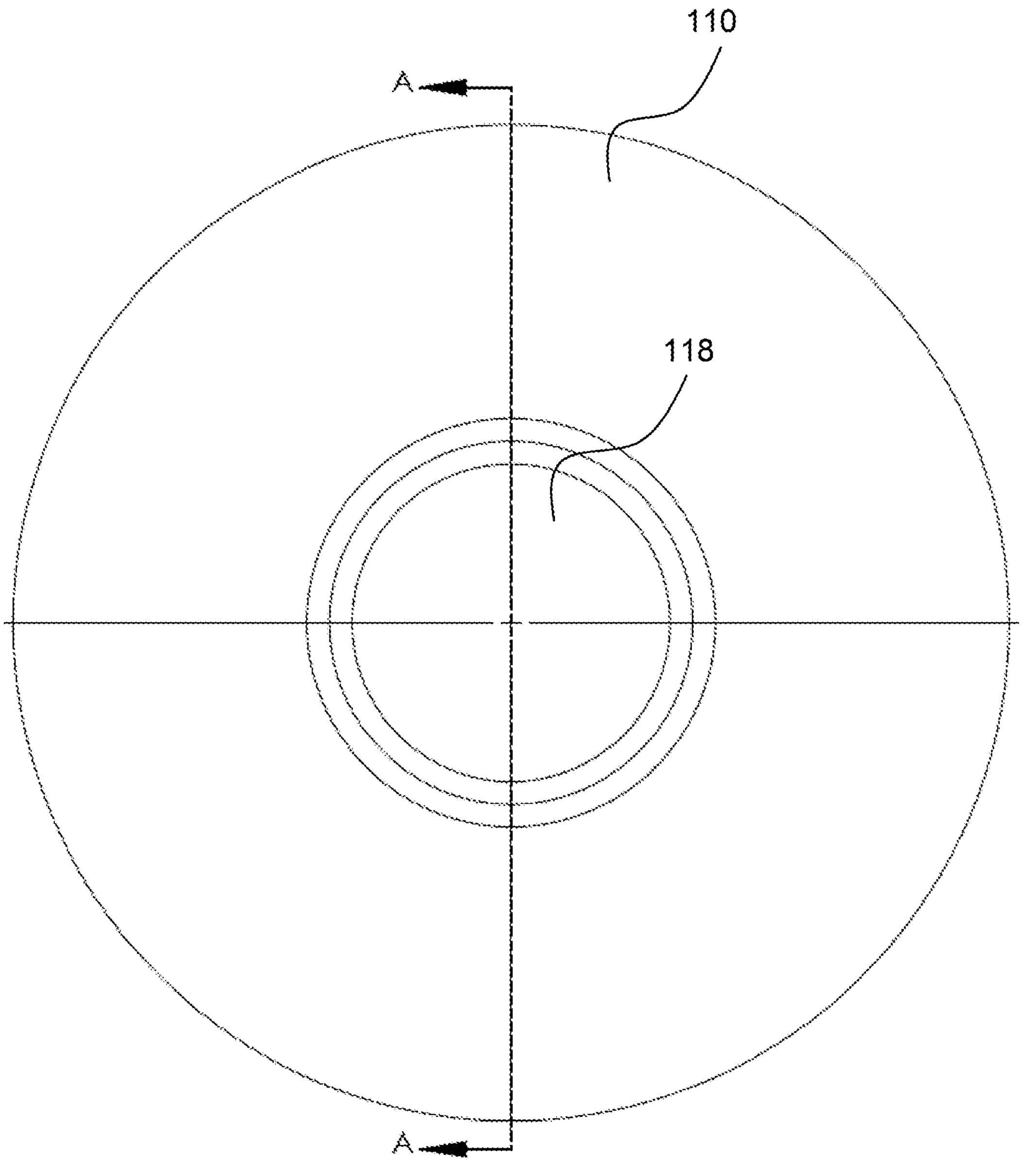
FIG. 13 shows a front view of the sheave shown in FIG. 10.

FIG. 13 shows a side view of an exemplary sheave 110 having wheel aperture 118 therethrough.

Figure 14:
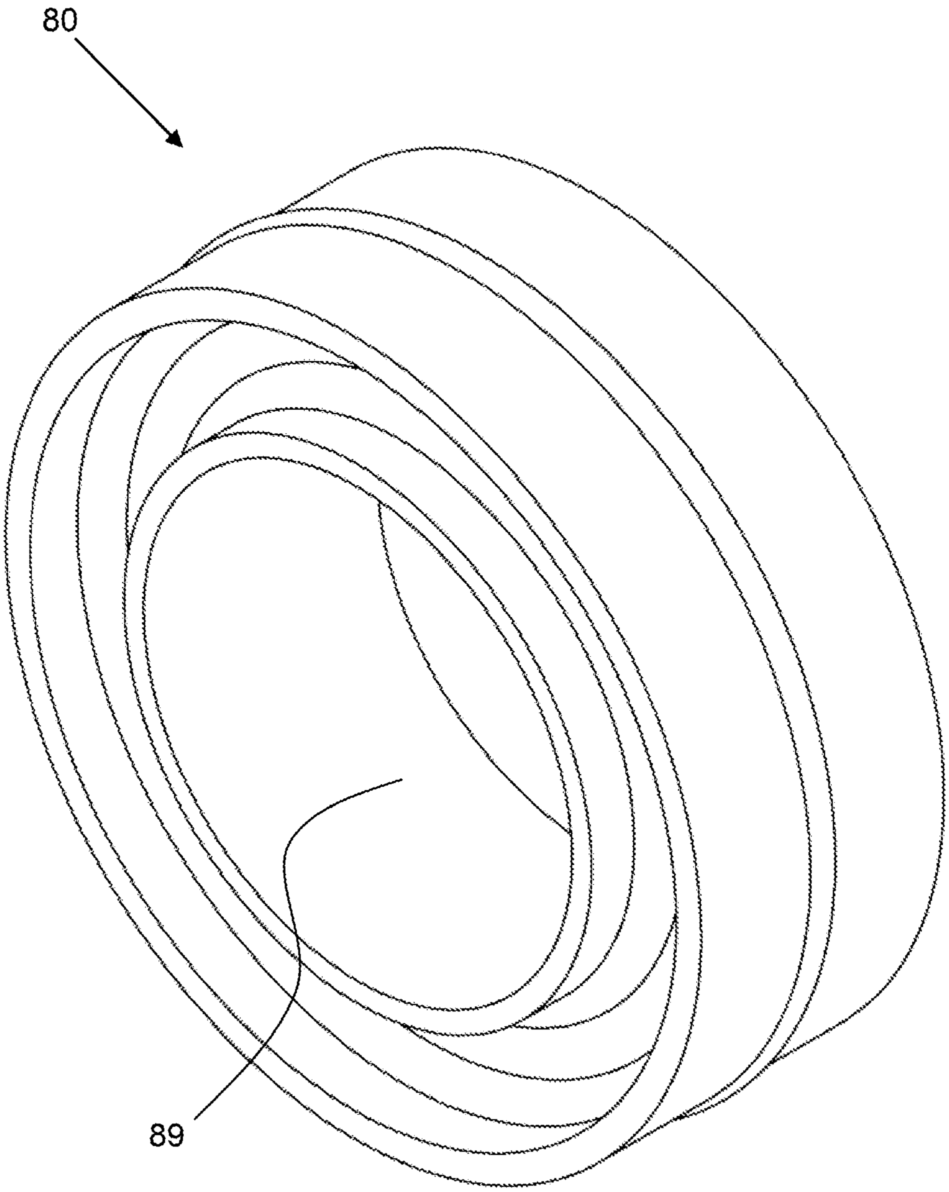
FIG. 14 shows a perspective view of a sheave wheel with a bushing aperture configured therethrough.
Figure 15:
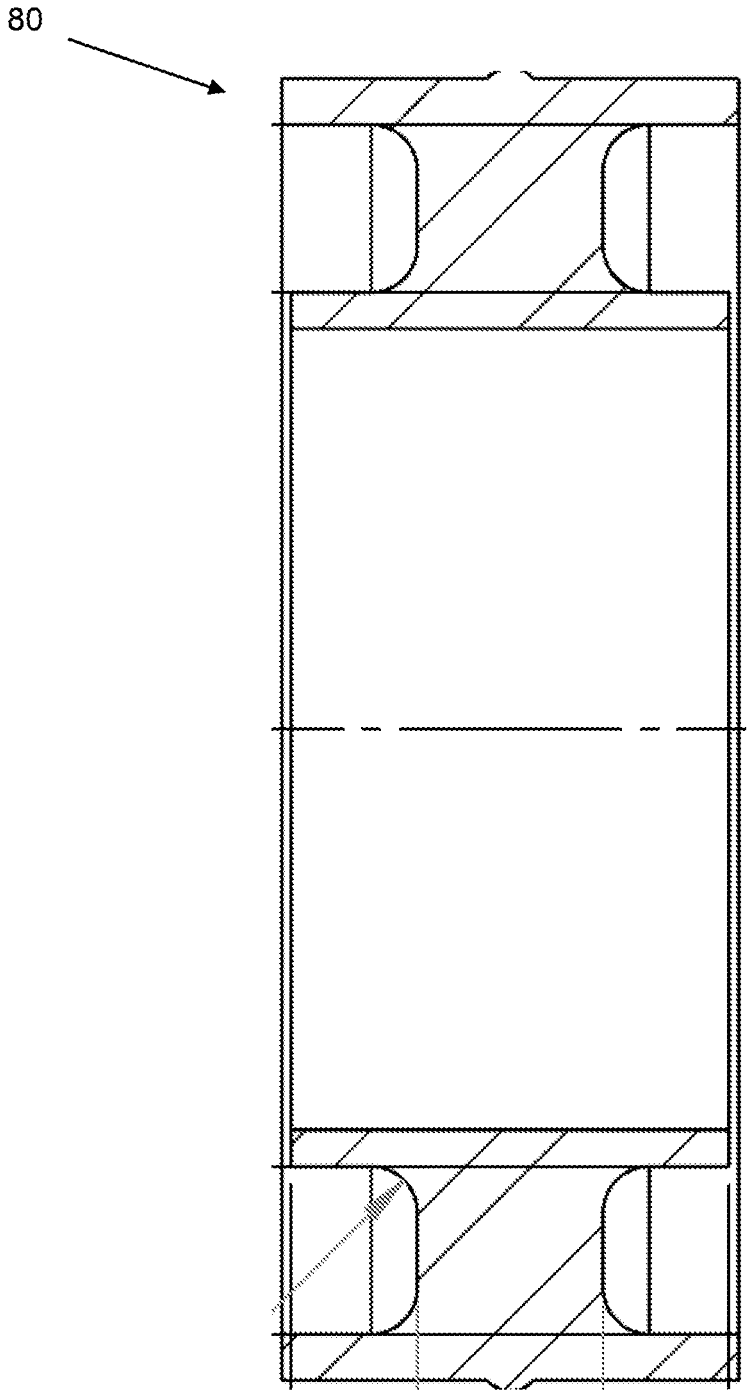
FIG. 15 shows a side cross-section view of the sheave wheel shown in FIG. 14.

As shown in FIGS. 14 and 15, a sheave wheel 80 has a bushing aperture 89, though which the bushing of the block (not shown in FIG. 14 or 15) may be configured.

Figure 16:
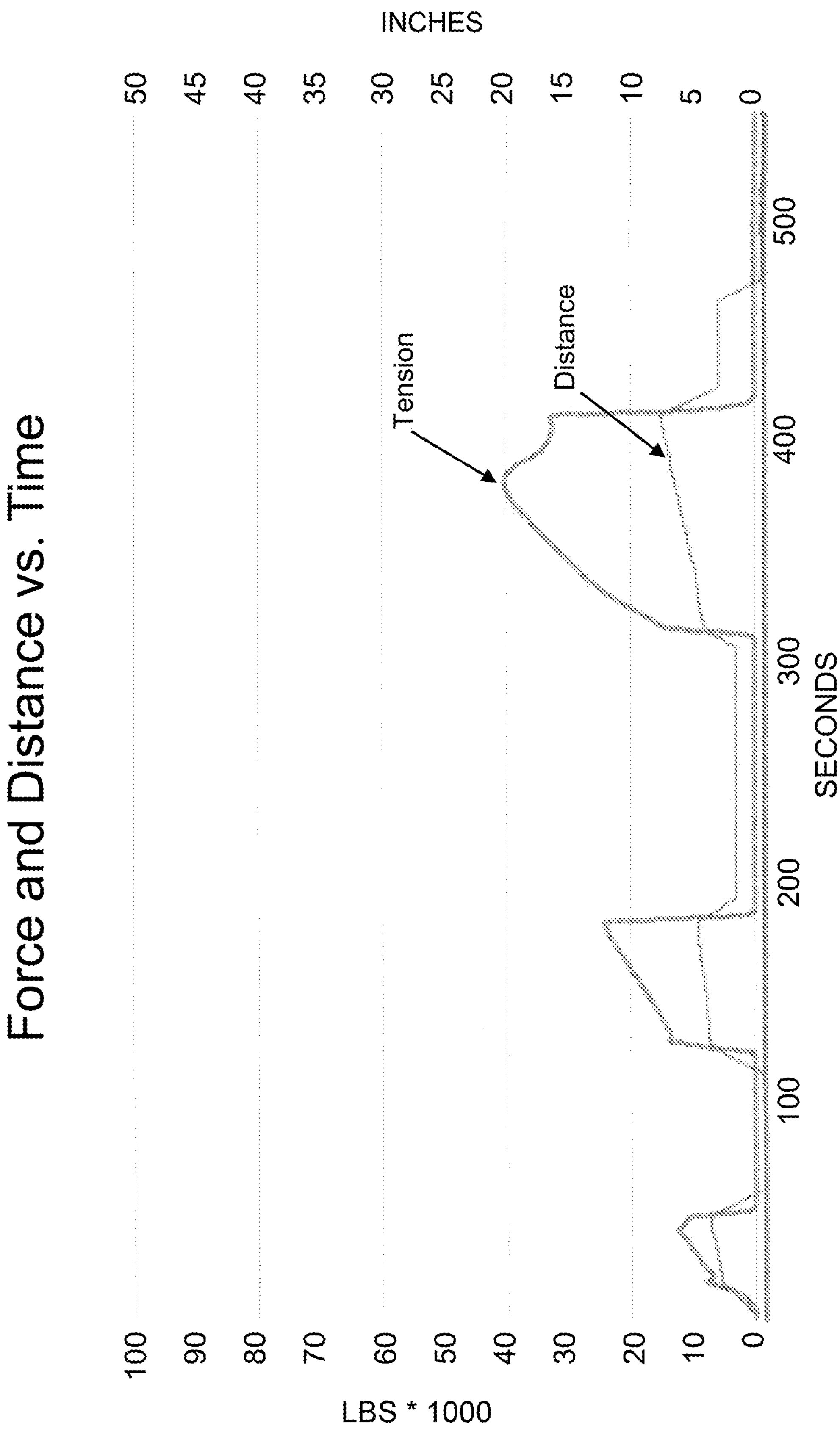
FIG. 16 shows a graph of force and distance versus time from a block as described herein tested under ASTM-E4 (Traceable to the National Institute of Standards and Technology).

As shown in FIG. 16, an exemplary block having a UHMWPE sheave was tested according to ASTM E-4 wherein a metal cable was configured around the sheave and then pulled to 5,443 kg (12,000 lbs) and then to 10,886 kg (24,000 lbs), and then to 21,772 kg (48,000 lbs) without catastrophic failure. The block has a 25.4 cm (10 inch) diameter sheave with aluminum side plates. The cable was capable of carrying 100 tons. The load fasteners and the axle fastener were each 3/16 Stainless Steel bolts 19 mm (¾ inch). The length was about 8.89 cm (3.5 inches). The offset angle of the leg extension of the load wye plate was 38.2 degrees.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A modular block comprising:

a) a pair of load fasteners;

b) a pair of load fastener retainers;

c) an axle fastener;

d) a pair of load wye plates, each comprising:

i) a wheel portion having an axle fastener aperture therethrough;

a pair of load extension arms extending from the wheel portion at an offset angle to each other, each load extension arm comprising a load fastener aperture with one of the pair of load fasteners extending through a respective load fastener aperture, and wherein each of the pair of load fastener retainers are secured to a respective load fastener;

e) a bushing extending between the pair of load wye plates and retained by the axle fastener extending through the wheel portion of the pair of load wye plates;

f) a sheave wheel having a bushing aperture and wherein the bushing extends through said bushing aperture;

g) a sheave comprising:

i) a wheel aperture, wherein the sheave wheel is configured in the wheel aperture;

ii) a cable guide extending around the outer perimeter of the sheave and having a guide well for guiding a cable along the cable guide;

h) a pair of side plates configured between the respective load wye plates and the sheave wheel, each comprising:

i) a wheel portion having an axle fastener aperture therethrough;

ii) a pair of retainer extension arms extending from the wheel portion of the side plate at an offset angle to each other, each retainer extension arm comprising a load fastener aperture therethrough for receiving one of said pair of load fasteners therethrough;

i) an eye assembly comprising:

i) an eye comprising:

a retainer shank;

a base flange; and a mount portion having a mount aperture;

wherein the base flange extends radially outward from an eye axis more than the retainer shank;

ii) a pair of split load blocks, each comprising:

a sheave receiver; and a pair of load flanges extending out in opposing directions from said sheave receiver and each comprising a load aperture for receiving a respective load fastener therethrough;

wherein each of the pair of load fasteners extend through respective load apertures in the pair of load wye plates, the load apertures in the pair of side plates, and the load apertures in the pair of load flanges of the pair of split load blocks;

wherein the modular block is modular and configured to be disassembled by removal of the load fasteners and the axle fastener from the load apertures and axle aperture, respectively.

2. The modular block of claim 1, wherein the offset angle is 75 degrees or less.

3. The modular block of claim 1, wherein the offset angle is 60 degrees or less.

4. The modular block of claim 1, wherein the offset angle is between 30 degrees 75 degrees.

5. The modular block of claim 1, wherein the load fasteners are bolts with external threads, and wherein the load fastener retainers are nuts with corresponding internal threads.

6. The modular block of claim 1, wherein a load imposed on the modular block is born by the load fasteners, the axle fastener, the load wye plates, the eye, and the load split blocks and whereby none of said load is born by the side plates.

7. The modular block of claim 6, wherein when the modular block is configured to be disassembled by removal of the load fasteners and the axle fastener from the load apertures and axle apertures, respectively.

8. The modular block of claim 1, wherein the side plates are made of a non-metallic material.

9. The modular block of claim 8, wherein the side plates are made of carbon fiber.

10. The modular block of claim 8, wherein the side plates are made of a polymeric material.

11. The modular block of claim 8, wherein the sheave is made of a non-metallic material.

12. The modular block of claim 11, wherein the sheave is made of a polymeric material.

13. The modular block of claim 11, wherein the swivel eye extends along a swivel eye axis and rotates about the swivel eye axis within the split load blocks, wherein the mount portion is configured on a first end and wherein the base flange is configured on a second end, opposite the first end.

14. The modular block of claim 1, wherein the eye is a swivel eye wherein the retainer shank spins within the load blocks.

15. The modular block of claim 14, wherein the split load blocks each comprise a swivel eye receiver and are configured adjacent to each other whereby the retainer shank of the swivel eye is configured between the sheave receivers of the split load blocks;

wherein the split load blocks are held adjacent to each other by the load fasteners; and wherein the eye is retained between the split load blocks with the retainer shank aligned with the swivel eye receiver of each of the split load blocks, wherein the swivel eye receiver of the split load blocks is configured between the mount portion and the base flange of the swivel eye.

16. The modular block of claim 1, wherein each of the pair of load wye plates have a thickness that is at least twice the thickness of one of the pair of side plates.

17. The modular block of claim 16, wherein the load wye plates are made of metal and wherein each of the pair of side plates are made of a polymer.

18. The load modular block of claim 1, wherein the sheave is non-metallic.

19. The modular block of claim 1, wherein the sheave is made of a polymer.

20. The modular block of claim 19, wherein the sheave is made of ultrahigh molecular weight polyethylene (UHMWPE).

21. The modular block of claim 1, wherein the load wye plate is coated with a corrosive resistant material.

22. The modular block of claim 1, wherein the eye is coated with a non-metallic material.

* * * * *